(12) United States Patent
Ehlis Pirretas et al.

(10) Patent No.: US 10,774,983 B2
(45) Date of Patent: Sep. 15, 2020

(54) SUPPORT SYSTEM FOR MOBILE DEVICES

(71) Applicant: AIKLO TECHNOLOGIES, S. L., Barcelona (ES)

(72) Inventors: Sergio Ehlis Pirretas, Barcelona (ES); David Palomar Cros, Barcelona (ES)

(73) Assignee: AIKLO TECHNOLOGIES, S. L., Barcelona (ES)

( * ) Notice: Subject to any disclaimer, the term of this patent is extended or adjusted under 35 U.S.C. 154(b) by 131 days.

(21) Appl. No.: 16/315,324

(22) PCT Filed: Jul. 4, 2017

(86) PCT No.: PCT/ES2017/070484
§ 371 (c)(1),
(2) Date: Jan. 4, 2019

(87) PCT Pub. No.: WO2018/007668
PCT Pub. Date: Jan. 11, 2018

(65) Prior Publication Data
US 2019/0309897 A1  Oct. 10, 2019

(30) Foreign Application Priority Data
Jul. 7, 2016 (ES) .................................. 201630926

(51) Int. Cl.
*B60R 11/02* (2006.01)
*F16M 1/00* (2006.01)
(Continued)

(52) U.S. Cl.
CPC ............. *F16M 13/02* (2013.01); *B60R 11/02* (2013.01); *B60R 11/0241* (2013.01);
(Continued)

(58) Field of Classification Search
CPC ................. B60R 11/02; B60R 11/0241; B60R 11/0247; F16M 11/02; F16M 11/04;
(Continued)

(56) References Cited

U.S. PATENT DOCUMENTS 5,457,745 A * 10/1995 Wang .................. B60R 11/0241
379/426
6,366,672 B1 * 4/2002 Tsay .................... B60R 11/0241
379/446
(Continued)

FOREIGN PATENT DOCUMENTS

| EP | 2416049 A2 | 2/2012 |
| EP | 2608493 A1 | 6/2013 |

(Continued)

OTHER PUBLICATIONS

International Search Report and Written Opinion dated Nov. 22, 2017 in corresponding International Application No. PCT/ES2017/070484; 13 pages.

*Primary Examiner* — Xiaoliang Chen
(74) *Attorney, Agent, or Firm* — Maier & Maier, PLLC

(57) ABSTRACT

Support system for mobile devices with a main body provided with a lower stop element, movable in a vertical direction with respect to the main body, two lateral stop elements simultaneously movable, in opposite directions, with respect to the main body, an elastic element acting on the lateral stop elements and which tend to move the latter two in a horizontal approaching direction of their respective front flanges, and an upper stop element mounted on the main body with the possibility of manual movement in a vertical direction. The support system may further include a power source and lighting elements integrated in the main body.

9 Claims, 5 Drawing Sheets

(51) Int. Cl.
*F16M 1/04* (2006.01)
*F16M 11/02* (2006.01)
*F16M 11/04* (2006.01)
*H04B 1/3822* (2015.01)
*H04B 1/3877* (2015.01)
*F16M 13/02* (2006.01)
*F21S 9/02* (2006.01)
*F21V 33/00* (2006.01)
*H04M 1/04* (2006.01)
*F16M 13/00* (2006.01)
*F21Y 115/10* (2016.01)
*B62J 11/00* (2020.01)
*B60R 11/00* (2006.01)

(52) U.S. Cl.
CPC .......... *F16M 11/041* (2013.01); *F16M 13/00* (2013.01); *F16M 13/022* (2013.01); *F21S 9/02* (2013.01); *F21V 33/0052* (2013.01); *H04M 1/04* (2013.01); *B60R 2011/0071* (2013.01); *B62J 11/00* (2013.01); *F21Y 2115/10* (2016.08)

(58) Field of Classification Search
CPC ....... F16M 11/041; F16M 11/11; H04M 1/00; H04M 1/04; H04B 1/3822; H04B 1/3877
USPC ................ 361/760; 379/426, 441, 446, 454; D14/253; 224/409; 248/176.3; 455/575.1, 575.9
See application file for complete search history.

(56) References Cited

U.S. PATENT DOCUMENTS

| | | | |
|---|---|---|---|
| 6,552,513 | B1 | 4/2003 | Li |
| D707,672 | S * | 6/2014 | Lai .............. D14/253 |
| D716,215 | S * | 10/2014 | Dunn ............. D12/415 |
| D738,873 | S * | 9/2015 | Kim .............. D14/253 |
| D772,218 | S * | 11/2016 | Alesi ............. D14/253 |
| D772,859 | S * | 11/2016 | Alesi ............. D14/253 |
| 2004/0091102 | A1* | 5/2004 | Tsay ......... B60R 11/0241 379/441 |
| 2005/0236536 | A1* | 10/2005 | Fan ............... B60R 11/02 248/176.3 |
| 2009/0270143 | A1* | 10/2009 | Bury .......... B60R 11/0241 455/575.1 |
| 2010/0264182 | A1* | 10/2010 | Perlman ............ H04M 1/04 224/409 |
| 2015/0330426 | A1 | 11/2015 | Lien et al. |
| 2015/0333789 | A1* | 11/2015 | An ............... F16M 13/00 455/575.9 |
| 2016/0297062 | A1* | 10/2016 | Huang ............. F16M 11/14 |

FOREIGN PATENT DOCUMENTS

| | | |
|---|---|---|
| ES | 1060027 U | 7/2005 |
| ES | 1066781 U | 3/2008 |
| ES | 1137258 U | 3/2015 |

* cited by examiner

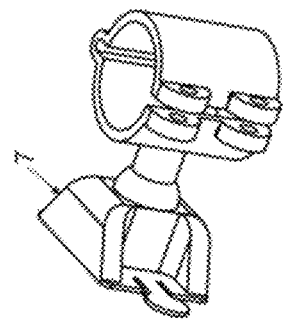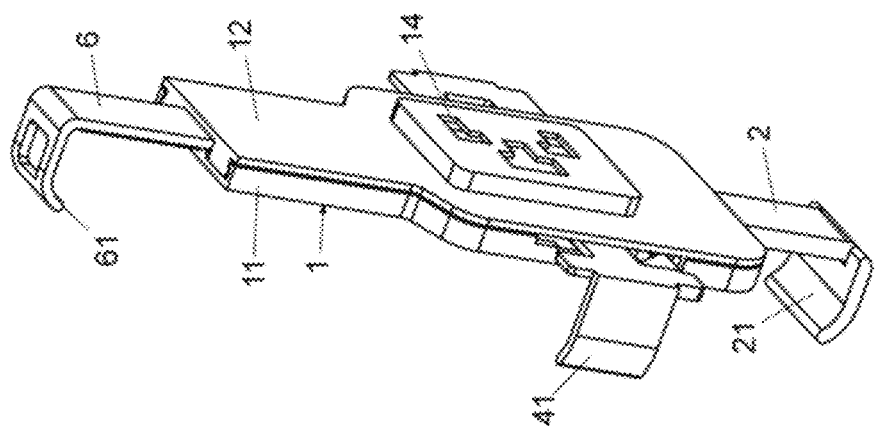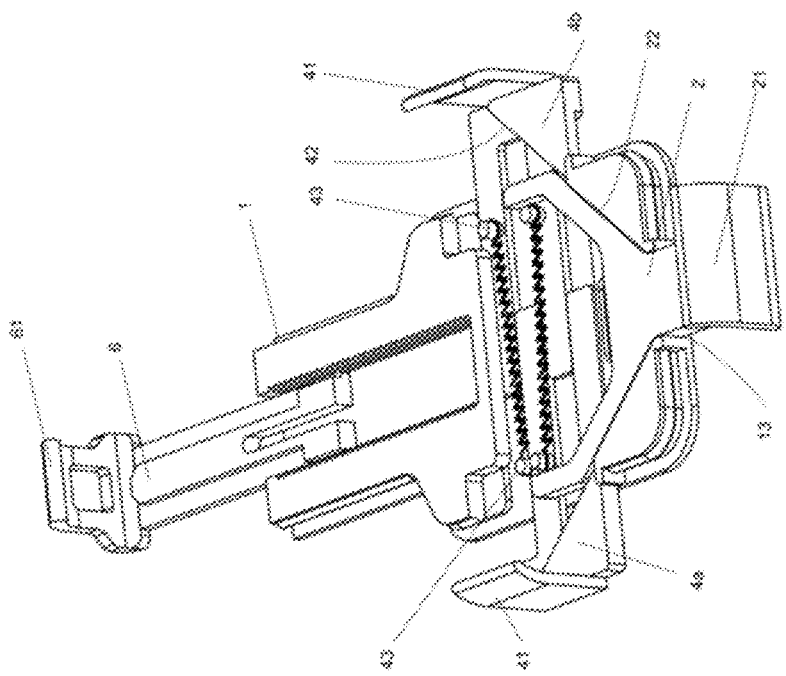

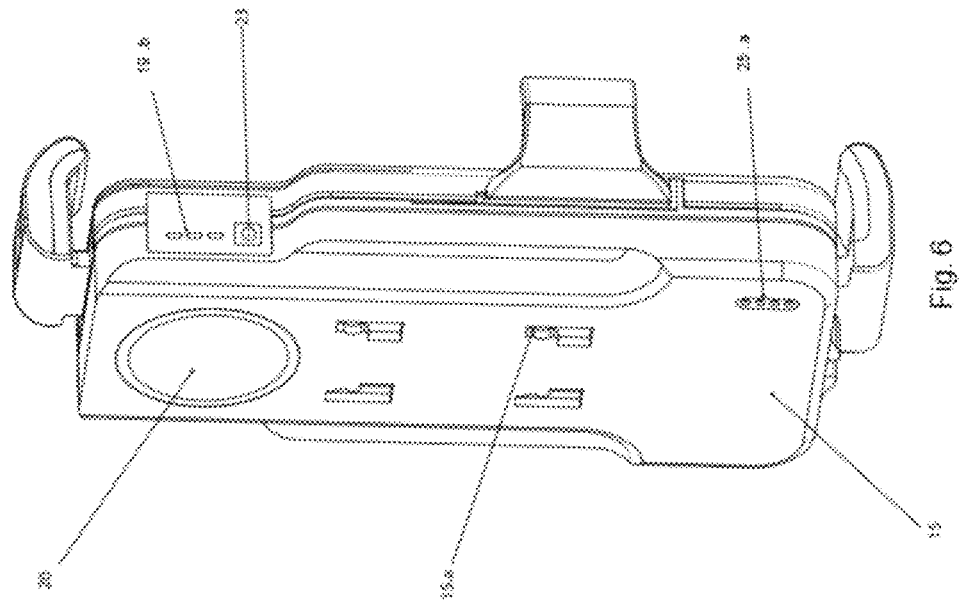
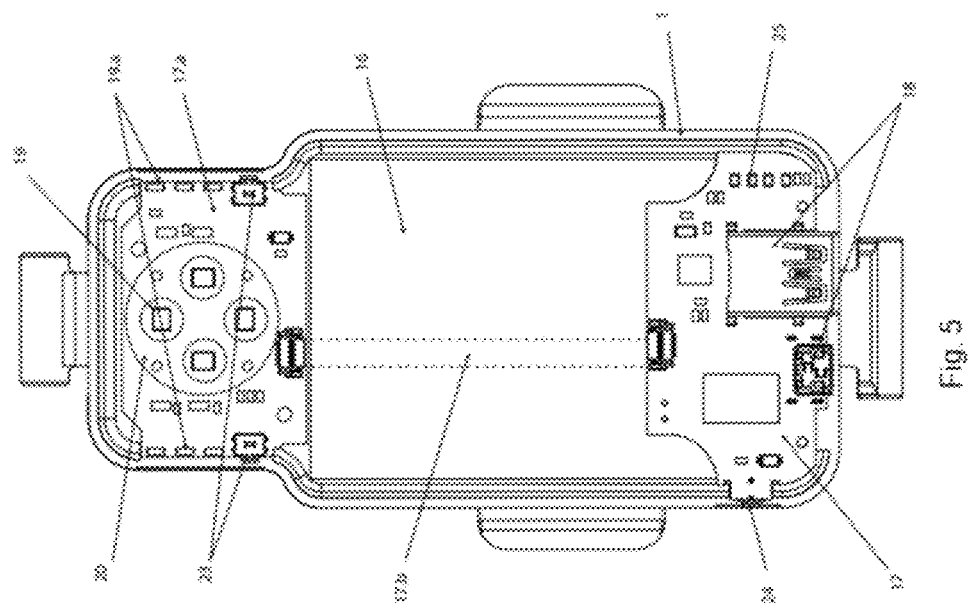

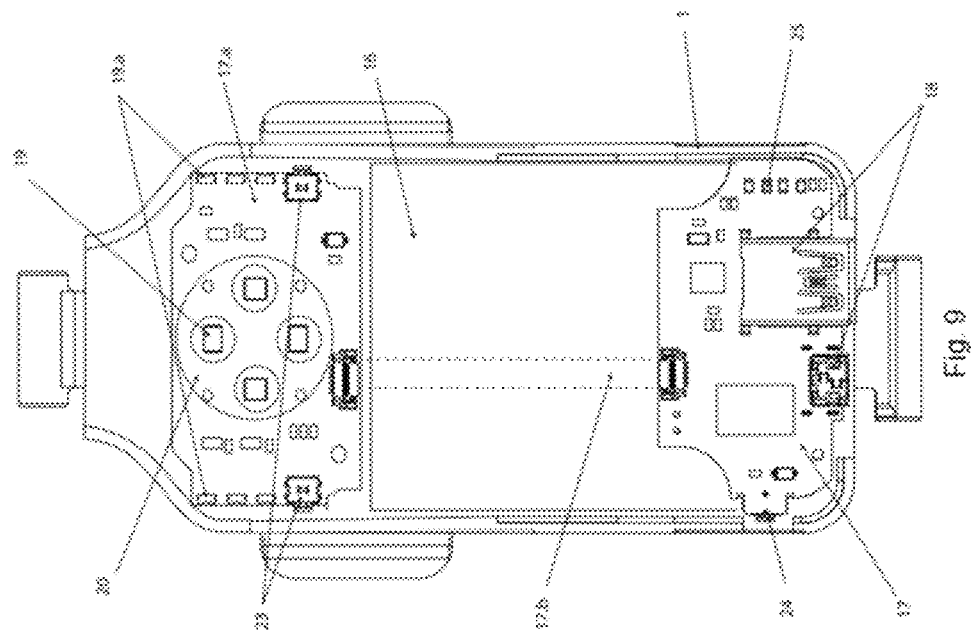
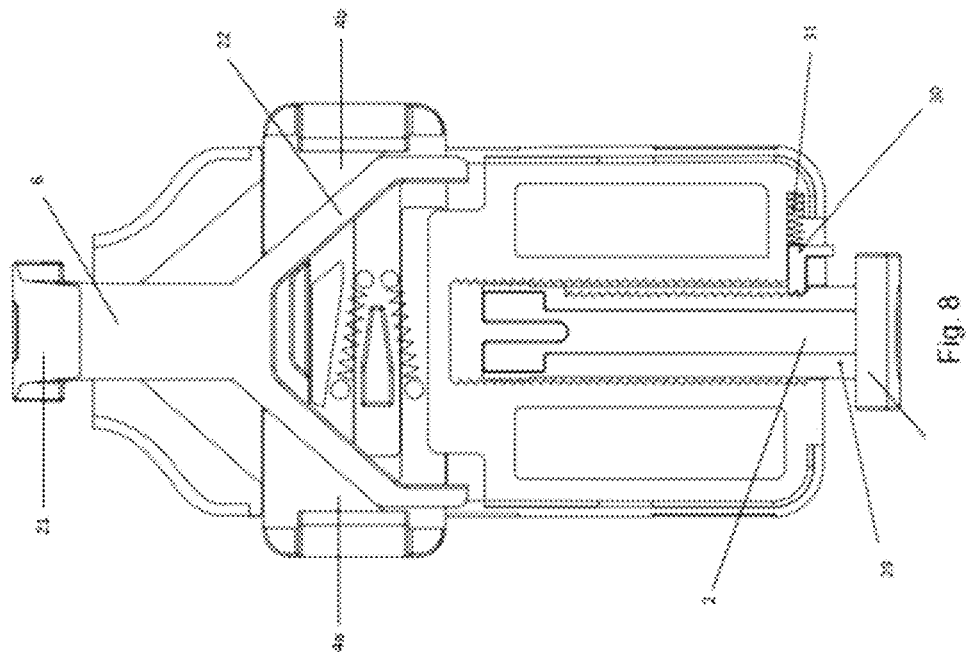

SUPPORT SYSTEM FOR MOBILE DEVICES

FIELD

The object of the present invention is a support system for mobile devices, which has features oriented to perform a stable fixing of the mobile apparatus and to allow the coupling thereto of different interchangeable supports suitable for fixation to the user himself or to different elements.

This invention is applicable in the field dedicated to the production of support systems for mobile devices, mainly mobile phones.

BACKGROUND

The massive deployment of mobile devices in the market, such as phones, tablets and cameras for recording various activities, has led to the manufacture of various accessories for this type of apparatus, such as covers or support devices.

In the case of support devices, it is possible to mention the existence of a high number of backgrounds, with diverse characteristics:

Utility model ES 1 066 781 U describes a support for mobile phones, characterized in that it comprises a housing cover of essentially rectangular configuration, incorporating perforations, to facilitate voice transmission/reception, and, at its upper part, a flap incorporating a fixing clamp attached to the flap by means of rivets or any other mechanical fixing means, adapted to securely fit over the edges of caps, hats or helmets.

Utility model ES 1 060 027 U describes a support for mobile phone characterized in that the phone charger itself, in its connected position to the mains, serves as a support point for the support.

Utility model ES 1 137 258 U describes a support for mobile devices with camera, such as mobile phones, tablets, video recording cameras or the like, and which is applicable in sports facilities with glazing, for example a paddle court, to be able to record the game of the users of the track; characterized in that it is configured from a box that determines an interior compartment of dimensions suitable to accommodate a device with a camera of different sizes, said box having at least one transparent face in which it has fixing means that enable its adhesion in a fixed and permanent manner to the glazed surface of the track, in such a way that the device can be placed in an appropriate position inside said interior compartment to record through said transparent face of the box and the glazing of the track to which it is adhered.

These supports, as well as other existing ones in the market, present several disadvantages, such as:

They do not have suitable means for their adaptation to the measures of the mobile apparatus to be supported and for a stable fixation of the same on diverse elements.

They do not allow easy extraction and replacement of the mobile device during sport, to for example, send a WhatsApp, visualize a received photo, look at the GPS, etc. In the case of the jogging cover, it is uncomfortable as the hub of the headset and the telephone must be removed and then replaced.

In the case of the fixing systems that allow the mobile device to be easily removed and replaced, they have the drawback that a specific case/cover is required for the mobile device, and therefore it does not allow the use of other covers or casings that the user desires.

The Applicant of the present invention is not aware of the existence of support systems for mobile devices which solve the above-mentioned problems and which anticipate the characteristics of the present invention.

SUMMARY

The support system for mobile devices object of this invention has features that address the above-mentioned problems, allowing an adaptation of its dimensions to those of the apparatus to be supported and the mounting in said system of interchangeable supports suitable for its attachment to diverse elements, either to an arm of the user, to a bicycle, or to any other.

To this end, and in accordance with the invention, this support system comprises the following elements:

a main body provided with a front cover for support of the mobile device and a rear face;

a lower stop element movable in a vertical direction with respect to the main body and comprising: a front flange for support of the lower end of a mobile device, an intermediate V-shaped bifurcation inferiorly defining two symmetrical ramps ascending towards opposite sides of the main body;

two lateral stop elements simultaneously movable, in opposite directions, with respect to the main body, and comprising: two front flanges for support on two opposite sides of the mobile device; two symmetrical wedges, ascending towards opposite sides of the main body and defining two inclined contact surfaces with the ramps of the lower stop element;

elastic means acting on the lateral stop elements and which tend to move the latter two in a horizontal approaching direction of their respective front flanges; and an upper stop element, provided with a front flange for support of the upper end of the mobile device, and which is mounted on the main body with the possibility of manual movement in a vertical direction.

With the aforementioned elements, in order to achieve stable mounting of the mobile apparatus in the support system, it suffices to move the lower stop element towards the lower zone, for example by pushing the front flange of said lower stop element in a downward direction with the lower part of the mobile apparatus, to enable the lateral stop elements to be spaced laterally, allowing the back surface of the mobile device to be supported on the front cover of the main body of the support system, so that the mobile apparatus is disposed between the lower, lateral and upper stop elements.

When releasing the mobile apparatus, the lower and lateral stop elements move to make the gripping and fixing of said mobile apparatus by the action of the first elastic means; the mobile apparatus being fixed at the upper end by the manual movement of the upper stop element, in a downward direction, until its front flange acts on the upper end of the mobile apparatus and is totally immobilized.

It should be mentioned that the upper stop element is adjusted only once to the size of the mobile device. The movement of the lower and lateral stop elements, sufficient to mount and dismantle the mobile apparatus from the support, makes it necessary to re-adjust the upper stop element.

Alternatively, a support system to accommodate different designs of mobile devices having bottom side buttons is provided, in which the lower and upper stop elements are reversed, leaving the lower V-shaped stop element at the top of the device and the upper stop element at the lower part, adding a safety mechanism to prevent it from moving by a sudden movement.

In this invention it is also envisaged that the main body of the system has at its rear part a detachable support, preferably of the standard type for attachment to various elements; said detachable support being able to have a configuration suitable for attachment to an arm of the user; to a bicycle handlebar; to a bar; to a helmet, or to any other element, since the shape of said detachable support does not vary the essential characteristics of the invention.

In addition, it has been envisaged that the main body may have lighting elements, which among its possible uses provide light during the practice of sport, and a power supply, which feeds said lighting elements and optionally contributes additional energy to the mobile device coupled to the support system.

BRIEF DESCRIPTION OF THE DRAWINGS

In order to complement the description that is being made and facilitate the understanding of the features of the invention, a set of drawings is attached to the present specification in which, with an illustrative and non-limiting character, the following has been represented:

FIG. 3 shows a view similar to that of FIG. 2 with the lower, lateral and upper stop elements, moved towards the outside of the main body.

FIG. 4 shows a rear perspective view of the support system of the previous figures provided with a rear anchor for mounting of interchangeable supports, and one of said supports being disassembled from the rear anchor.

FIG. 5 shows a rear plan view of another embodiment of the support system, without the rear cover of the main body, which includes the electronic components.

FIG. 6 shows a rear perspective view of the exemplary embodiment of the previous figure provided with the rear cover with the anchor for mounting interchangeable supports.

FIG. 8 shows a front plan view of another embodiment of the support system, in inverted mode, without the front cover of the main body, and with the lower, lateral and upper stop elements in a retracted position.

FIG. 9 shows a rear view of the embodiment of the support system of FIG. 8, without the rear cover of the main body, which includes the electronic components.

DETAILED DESCRIPTION

Figures 1, 2:
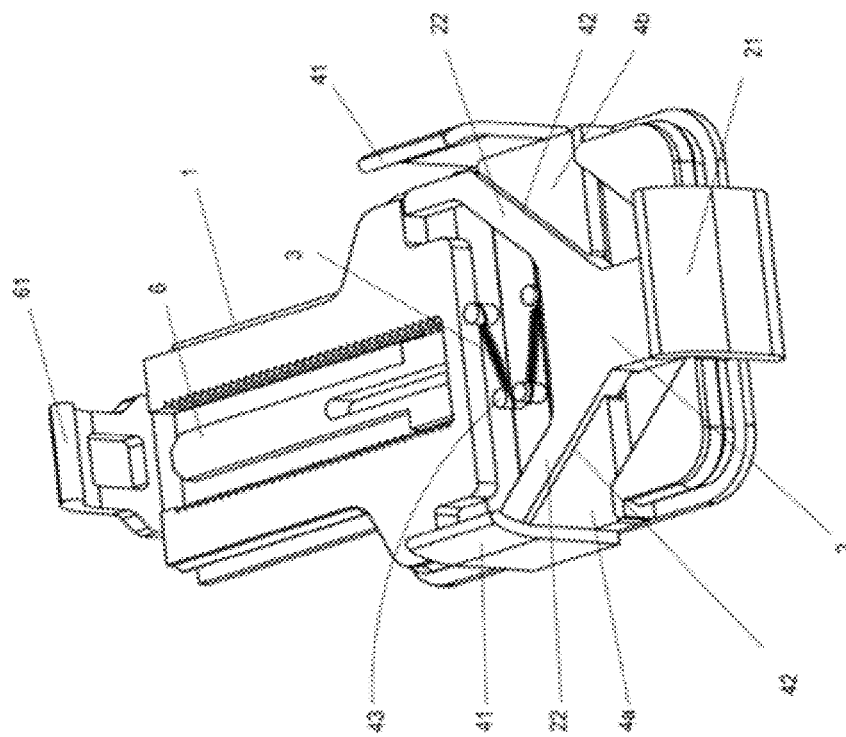
FIG. 1 shows a front perspective view of a preferred embodiment of the support system for mobile devices according to the invention, with the lower, lateral and upper stop elements in a retracted position.
FIG. 2 shows a front perspective view of the embodiment of the previous figure, without the front cover of the main body, and with the lower, lateral and upper stop elements in a retracted position.

In the preferred embodiment shown in the accompanying FIGS. 1 to 4, the support system for mobile devices comprises:
- a main body (1) provided with a front cover (11) for supporting the mobile device and a rear face (12);
- a lower stop element (2), movable in a vertical direction with respect to the main body (1) and comprising a front flange (21) for support of the lower end of a mobile apparatus;
- two lateral stop elements (4a, 4b) simultaneously movable, in opposite directions, with respect to the main body (1) and comprising: two front flanges (41) for support on two opposite sides of the mobile device;
- elastic means (3) acting on the lateral stop elements (4a, 4b) and which tend to move the latter two in a horizontal approaching direction of their respective front flanges (41);
- an upper stop element (6), provided with a front flap (61) for support on the upper end of the mobile apparatus, and which is mounted on the main body (1) with the possibility of manual movement in a vertical direction. This upper stop element can have a hole to place the hub of the headphones in case the mobile device has the hole in the middle.

The elastic means (3) tend to maintain the lateral stop elements in the retracted position shown in FIGS. 1 and 2.

The lower stop element (2) comprises an intermediate V-shaped bifurcation inferiorly defining two symmetrical ramps (22) ascending towards opposite sides of the main body (1); and the lateral stop elements (4a, 4b) comprise two symmetrical wedges (42), ascending towards opposite sides of the main body (1) and defining two inclined contact surfaces with the symmetrical ramps (22) of the lower stop element (2), in such a way that when moving the lower stop element (2) in a downwards direction the lateral stop elements (4a, 4b) are laterally separated adopting the position shown in FIG. 3, in order to allow the support of the mobile apparatus (not shown) on the front cover (11).) of the main body.

When releasing the lower stop element (2), said lower stop element (2) and lateral stop elements (4a, 4b) tend to return to the retracted position, holding the mobile apparatus by its lower and lateral ends.

The upper stop element (6) moves manually, in a vertical direction, with respect to the main body (1).

In the example shown in FIGS. 2 and 3, the elastic means (3) comprises an elastic ring acting on lugs (43) defined in the lateral stop elements (4a, 4b). As shown in FIG. 4, the main body (1) has on its rear face (12) an anchor (14) for mounting different interchangeable supports (7), in which case a support having a clamp for attachment to a bicycle handlebar or any other rod has been represented.

Alternatively, according to another possible embodiment, as shown in FIG. 8, the upper stop element (6) and lower stop element (2) are inverted in the support system in such a way that the upper stop element (6) is movable in a vertical direction with respect to the main body (1) and comprises a front flange (21) for support of the upper end of a mobile apparatus; and the lower stop element (2) is provided with a front flange (61) for support on the lower end of the mobile apparatus, and is mounted on the main body (1) with the possibility of manual movement in a vertical direction.

The upper stop element (6) comprises an inverted V-shaped intermediate bifurcation superiorly defining two symmetrical ramps (22) descending towards opposite sides of the main body (1); and the lateral stop elements (4a, 4b) comprise two symmetrical wedges (42), descending towards opposite sides of the main body (1) and defining two inclined contact surfaces with the symmetrical ramps (22) of the upper stop element (6), in such a way that when moving the upper stop element (6) in an upward direction the lateral stop elements (4a, 4b) are laterally separated so as to allow the support of the mobile apparatus on the front cover (11) of the main body to be displaced by moving the upper stop element (6) in an upward direction.

When releasing the upper stop element (6), said upper stop element (6) and lateral stop elements (4a, 4b) tend to return the retracted position, holding the mobile apparatus by its upper and lateral ends.

The lower stop element (2) includes a safety system comprising a locking system (30) provided with a lower crimp (29) to prevent it from being opened and a drive spring (31).

According to another possible different embodiment, as shown in FIGS. 5, 6 and 9, the support system includes electronic components integrated in the rear face (12) of the main body (1) comprising a power source (16) and lighting elements (19, 19a).

The lighting elements are preferably front LEDs (19) and lateral LEDs (19a) electrically connected to an upper PCBA (Printed Circuit Board Assembly) (17a).

The power source (16), preferably a rechargeable battery, is connected to a main lower PCBA (17) which feeds the lighting elements (19, 19a) and optionally provides an additional power input to the coupled mobile device.

On/off of the PCBA is controlled by buttons (23, 24) which turn on/off the upper PCBA (17a) and the main lower PCBA (17) respectively.

A connecting cable (17b) connects the main lower PCBA (17) and the upper PCBA (17a) to each other.

Figure 7:
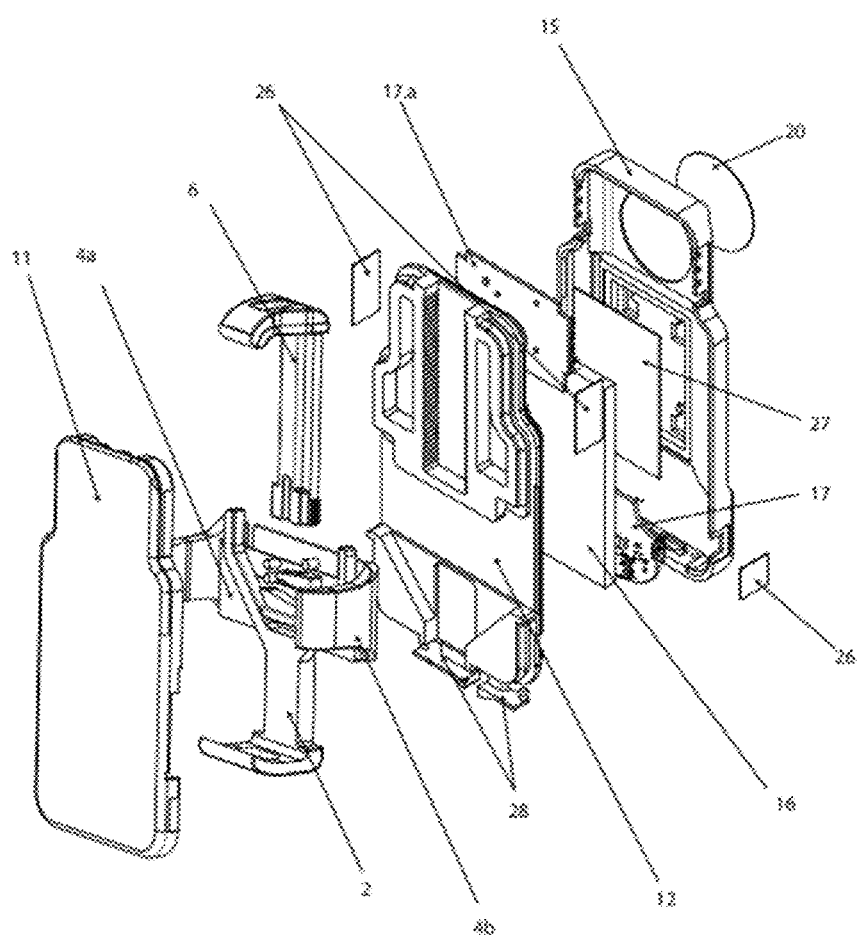
FIG. 7 shows an exploded view of the embodiment of the system of FIG. 6.

As shown in FIG. 7, the system has a rear insulating cover (27) which prevents dust/water from entering the electronic part. The assembly of the electronic devices and the insulation cap are sealed inside the main body (1) by a rear cover (15). The rear cover (15) comprises an anchor (15a) for mounting different interchangeable supports (7).

The main body (1) has insulating adhesive cover sheets (26) in the areas of the buttons (23,24) and lighting (19, 19a), as well as covers (28) which are inserted into connectors (18) of the lower PCBA (17), in order to achieve a correct seal.

When the lighting elements are on, the light emitted by the lateral LEDs (19a) is visible through the light ports (19b) of the insulating adhesive cover sheets (26) and the light emitted by the front LEDs (19) is visible through a reflector (20) of the rear cover (15).

The main lower PCBA (17) comprises LEDs (25) indicative of the power supply battery level (16) visible through the light ports (25a) of the rear cover (15).

Once the nature of the invention has been sufficiently described, as well as different embodiments, it is noted for the purposes that the materials, shape, size and arrangement of the described elements may be modified, provided that this does not imply an alteration of the essential characteristics of the invention, which are claimed below.

The invention claimed is:

1. A support system for mobile devices, comprising:
   a main body provided with a front cover for support of the mobile device and a rear face;
   a lower stop element, movable in a vertical direction with respect to the main body and comprising: a front flange for support of the lower end of a mobile device, an intermediate V-shaped bifurcation which inferiorly defines two symmetrical ramps ascending towards opposite sides of the main body;
   two lateral stop elements simultaneously movable, in opposite directions, with respect to the main body, and comprising: two front flanges for support on two opposite sides of the mobile device; two symmetrical wedges, ascending towards opposite sides of the main body and which define two inclined contact surfaces with the symmetrical ramps of the lower stop element;
   an elastic element acting on the lateral stop elements and which tend to move the latter two in a horizontal approaching direction of their respective front flanges; and
   an upper stop element, provided with a front flange for support on the upper end of the mobile apparatus, and which is mounted on the main body with the possibility of manual movement in a vertical direction.

2. The system according to claim 1, wherein the upper and lower stop elements are reversed in such a way that the upper stop element is movable in a vertical direction with respect to the main body and comprises a front flange for support of the upper end of a mobile device, an inverted V-shaped intermediate bifurcation superiorly defining two symmetrical ramps descending towards opposite sides of the main body, and the lower stop element being mounted on the main body with the possibility of manual movement in a vertical direction and comprising a locking system provided with a lower crimper and a drive spring.

3. The system according to claim 1, wherein the elastic element comprise an elastic ring acting on lugs defined in the lateral stop elements.

4. The system according to claim 1, further comprising a power source and lighting elements integrated in the main body, protected by a rear insulating cover and sealed by a rear cover and insulating adhesive cover sheets.

5. The system according to claim 4, wherein the power source is a rechargeable battery, electrically connected to a main lower PCBA that feeds the lighting elements.

6. The system according to claim 4, wherein the lighting elements are front LEDs and lateral LEDs electrically connected to an upper PCBA.

7. The system according to claim 5, wherein the main lower PCBA is connected to the upper PCBA by means of a connecting cable.

8. The system according to claim 1, wherein the main body has an anchor on its rear face or its rear cover respectively, for the mounting of different interchangeable supports.

9. The system according to claim 4, wherein the power source provides an additional power supply to the mobile device coupled to the support system.

* * * * *